US010611095B2

(12) United States Patent
Wood (10) Patent No.: US 10,611,095 B2
(45) Date of Patent: Apr. 7, 2020

(54) VITRINE AND METHOD FOR MAKING A VITRINE (71) Applicant: Wood & Wood, Inc., Greenfield, MA (US)

(72) Inventor: Van Wood, Greenfield, MA (US)

(73) Assignee: Wood & Wood, Inc., Greenfield, MA (US)

( * ) Notice: Subject to any disclaimer, the term of this patent is extended or adjusted under 35 U.S.C. 154(b) by 42 days.

(21) Appl. No.: 15/584,426

(22) Filed: May 2, 2017

(65) Prior Publication Data

US 2018/0319091 A1 Nov. 8, 2018

(51) Int. Cl.
B29C 65/00 (2006.01)
C03C 27/00 (2006.01)
C03B 33/00 (2006.01)
A47F 3/00 (2006.01)
B29C 65/48 (2006.01)
C03C 27/10 (2006.01)
B29C 65/54 (2006.01)
(Continued)

(52) U.S. Cl.
CPC ........ B29C 65/4845 (2013.01); B29C 65/548 (2013.01); B29C 66/02241 (2013.01); B29C 66/1162 (2013.01); B29C 66/4342 (2013.01); B29C 66/43421 (2013.01); B29C 66/71 (2013.01); B29C 66/73366 (2013.01); B29C 66/73921 (2013.01); C03C 27/10 (2013.01); A47F 3/005 (2013.01); B29C 66/4326 (2013.01); B29C 66/723 (2013.01); B29K 2033/04 (2013.01); B29K 2995/0029 (2013.01); C03B 33/02 (2013.01)

(58) Field of Classification Search
None
See application file for complete search history.

(56) References Cited

U.S. PATENT DOCUMENTS 3,651,975 A * 3/1972 Callan ................. A01K 63/003
220/4.29
3,893,777 A * 7/1975 Jones .................... B29C 66/112
403/268
3,927,643 A 12/1975 Ritzow et al.
(Continued)

FOREIGN PATENT DOCUMENTS

DE 3916415 A1 11/1990
DE 202010010795 U1 12/2010
(Continued)

OTHER PUBLICATIONS

English machine translation of Terasawa JP-57207022, Dec. 18, 1982, 2 pages. (Year: 1982).*

(Continued)

Primary Examiner — Linda L Gray
(74) Attorney, Agent, or Firm — Bulkley, Richardson and Gelinas, LLP; James C. Duda (57) ABSTRACT A method of joining panels for a vitrine is disclosed. The ends of the panels to be joined are mitered cut and bonded with a suitable adhesive providing adequate adhesion and transparency. The joints are formed to provide a wedge-shape bond gap sufficient to allow application of the adhesive from the outside of the gap through capillary action. The adhesive may be catalyzed or ultraviolet- or light-hardened.

11 Claims, 6 Drawing Sheets (51) Int. Cl.
    *C03B 33/02* (2006.01)
    *B29K 33/04* (2006.01)

(56) References Cited

U.S. PATENT DOCUMENTS

| | | | |
|---|---|---|---|
| 5,125,726 A | 6/1992 | Hahn et al. | |
| 7,289,013 B2 | 10/2007 | Decristofaro et al. | |
| 7,918,362 B2 | 4/2011 | Schmitt | |
| 8,031,471 B2 | 10/2011 | Schmitt | |
| 8,133,345 B2 * | 3/2012 | Goad | B29C 63/30 156/304.3 |
| 8,221,857 B2 | 7/2012 | Jaeger | |
| 2013/0283723 A1 | 10/2013 | Engstrom | |

FOREIGN PATENT DOCUMENTS

| | | | |
|---|---|---|---|
| EP | EP0053371 A2 | 9/1982 | |
| EP | 1811114 A2 | 7/2007 | |
| FR | 2759111 A1 * | 8/1998 | ............ B29C 65/42 |
| GB | 2485632 A1 | 5/2011 | |
| GB | 2529376 A1 | 2/2016 | |
| JP | 57207022 A * | 12/1982 | ......... B29C 66/1162 |

OTHER PUBLICATIONS

Schmitz, Mitered Glass Vitrines, http://schmitz-n-schmitz.com/mitered-glass-vitrines/ Reference Notes p. 1, Para 1-2-p. 2, Para 1-2.

Specfab, Manufacturing & Design Advice for Acrylic Cubes/Boxes, http://practicalmachinist.com/vb/general/manufacturing-design-advice-acrylic-cubes-boxes-309765/ Reference Notes p. 3, Para 6-10.

Dillmeier, UV Bonding, www.dillmeierglass.com/capabilities/uv-bonding/ Reference Notes p. 1, Para 1-3.

* cited by examiner

FIG. 1

Perspective View​ Side View

VITRINE AND METHOD FOR MAKING A VITRINE

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

APPLICABILITY OF THE INVENTION

This invention relates to the manufacture of multi-panel vitrines. The present invention relates particularly to the method of making such vitrines to minimize visible light disruptions.

BACKGROUND

Vitrines are containers made of glass or other hard, essentially transparent material that are used to display items in museums, shops, or homes. The quality required for a vitrine is dependent upon the purpose for which it will be used. Typically, museums and some shops, which display rare, intricate, and valuable items, seek vitrines that provide a secure yet uninterrupted and virtually invisible barrier between the displayed item and the observer. The transparent material used to provide such a barrier may be, for example, glass or acrylic. The acrylic material may have an anti-reflective material coating on its surface to minimize reflective visual distractions caused by extraneous light sources.

Most vitrines are made up of multiple flat panels that are joined in some manner to provide structural integrity. To minimize visual disturbance, vitrines may be designed so that the transparent panels are joined without opaque framework. In such designs, an adhesive may be used to join the panels. Where such panels are joined by an adhesive, a seam is created. The viewing experience through the panels of such a vitrine is substantially enhanced if the seam can be made to be virtually invisible. It is an object of the present invention to minimize and virtually eliminate the visual disturbance created by such a seam.

Current seaming techniques often result in seams with bubbles, which create optical distortion, or cause the appearance of the vitrine to deteriorate over time. If a flaw does appear, the panels normally must be discarded. Multiple failures are common, such that achieving a clear seam without flaws is typically very expensive.

One device that utilizes an adhesive for joining glass panels was presented in U.S. Pat. No. 3,651,975, for purposes of an aquarium. In this device, the panels are interconnected with fillets of adhesive that provide, in part, the ability to fold the panels upon themselves for transportation. The method disclosed for creating this form of glass enclosure consists of joining together panels, which each have 90 degree edges, with a large wedge of adhesive forced into the joint by a device such as a caulking gun. The large wedge of adhesive, the method of application, and the required adhesive smoothing and excess adhesive removal techniques presented, are likely to result in a translucent type joint with bubbles and other flaws, and are unlikely to result in an essentially fully transparent seam necessary for an uninterrupted viewing experience from varying angles that should be provided by a high quality vitrine.

Another such device was presented in U.S. Pat. No. 3,927,643, which also relies in part upon the use of an adhesive to join panels. This device uses mitered joints rather than 90 degree joints, so that a smaller amount of adhesive is necessary. The method disclosed for joining adjacent panels, however, relies upon simply laying a uniform strip of adhesive between the mitered joints before joining them together, apparently by pressure. Such a technique will frequently result in bubbles and other visually disturbing flaws in the seam.

Abrasion-resistant acrylic panels, typical of high quality vitrines, have a hard coating that pose additional problems. Abrasion-resistant panel material generally will not react with the adhesive. Thus, in order to apply an adhesive to a surface of an abrasion-resistant coated panel, the coating must be mechanically removed in the bond area of panel edges to be joined.

SUMMARY OF THE INVENTION

The present invention is a method of joining essentially transparent panels using mitered edges to create tapered joints that allow capillary migration of an adhesive between panels joined at the mitered edges. The particular advantage of this system with coated or anti-reflective material is that the bond area involves only the core of the material and does not involve the coated surface. Thus no coating has to be removed to create the bond.

DESCRIPTION OF THE INVENTION

The present invention is directed to the assembly of adjoining panels of essentially transparent material (e.g., acrylic, coated acrylic, anti-reflective acrylic, glass) to fabricate vitrines.

The process employs capillary action, which may be defined as the movement of a liquid within the spaces of a porous material due to the forces of adhesion, cohesion, and surface tension. Adhesion of a liquid to the walls of a vessel will cause an upward force on the liquid at the edges and result in a meniscus which turns upward. The surface tension acts to hold the surface intact. Capillary action occurs when the adhesion to the walls is stronger than the cohesive forces between the liquid molecules. The height to which capillary action will take a liquid is limited by surface tension and, of course, gravity. Thus, for a liquid to move a significant relative distance, the volume of the space through which the liquid will move must be small relative to the surface area that it will traverse. The present invention employs this principle to eliminate or minimize flaws in the delivery of adhesive to join panels of a vitrine.

Figure 1:
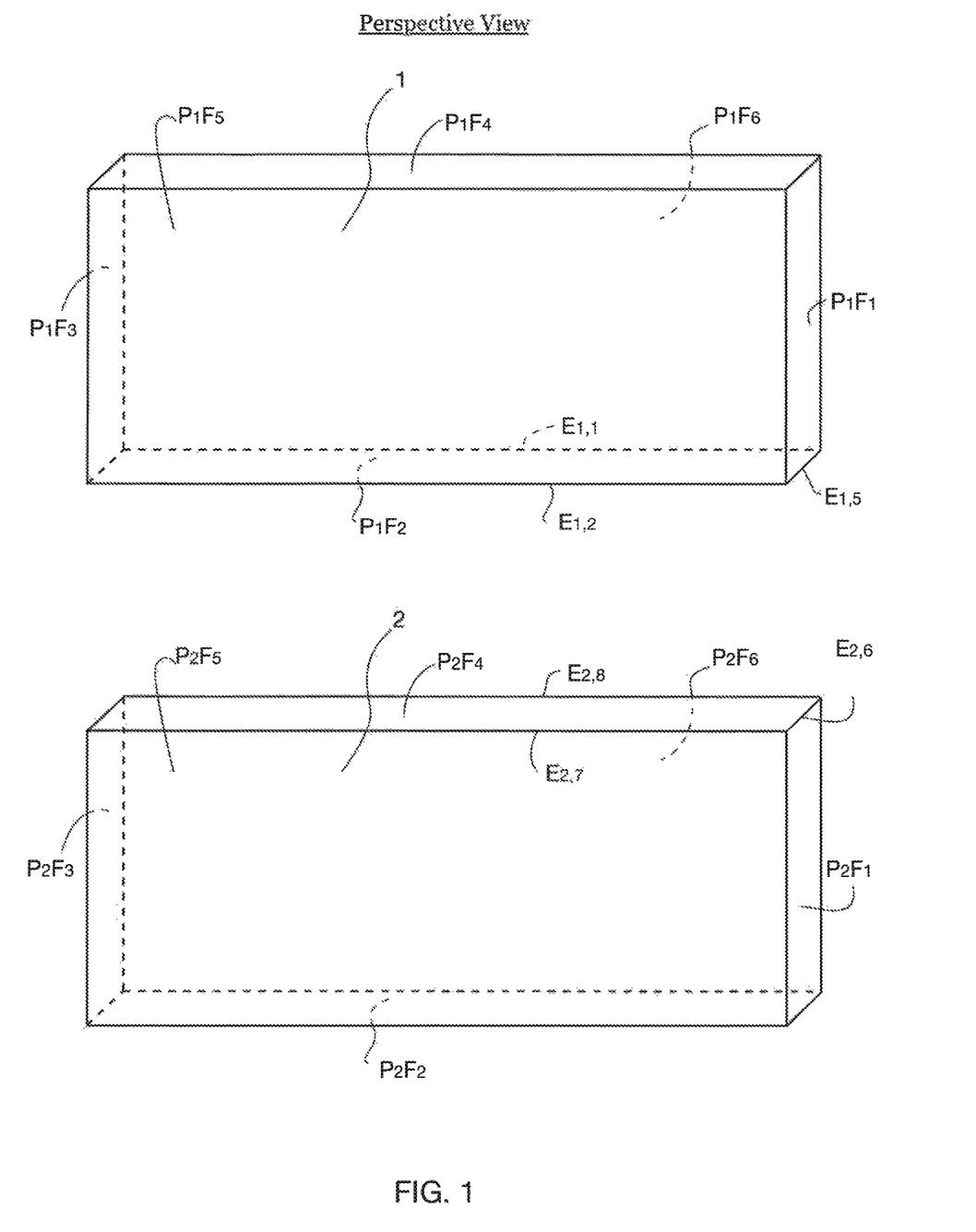
FIG. 1 is a perspective view of two panels to be joined, showing relevant faces and edges.

One embodiment of the present invention consists of joining one panel of acrylic material with an anti-reflective coating with another panel of the same acrylic material with coating at an essentially ninety degree angle. FIG. 1 shows a perspective view of a typical panel (1) used in the creation of a vitrine. This panel has six faces: the non-viewing thin edge faces of the panel, P1F1, P1F2, P1F3, and P1F4, which are typically between 0.125 inch and 0.75 inch in thickness, and the larger opposing viewing faces, P1F5 and P1F6, which may range from less than a foot to many feet in height and width. The panel has 12 edges, which may be labelled $E_{1,j}$, with j=1, 2, . . . 12. FIG. 1 also shows a second panel (2), also with six faces, including the thin edge faces P2F1, P2F2, P2F3, and P2F4 and the larger viewing faces P2F5, and P2F6. It similarly has edges that may be referenced as $E_{2,j}$, also with j=1, 2, . . . 12.

Figure 2:
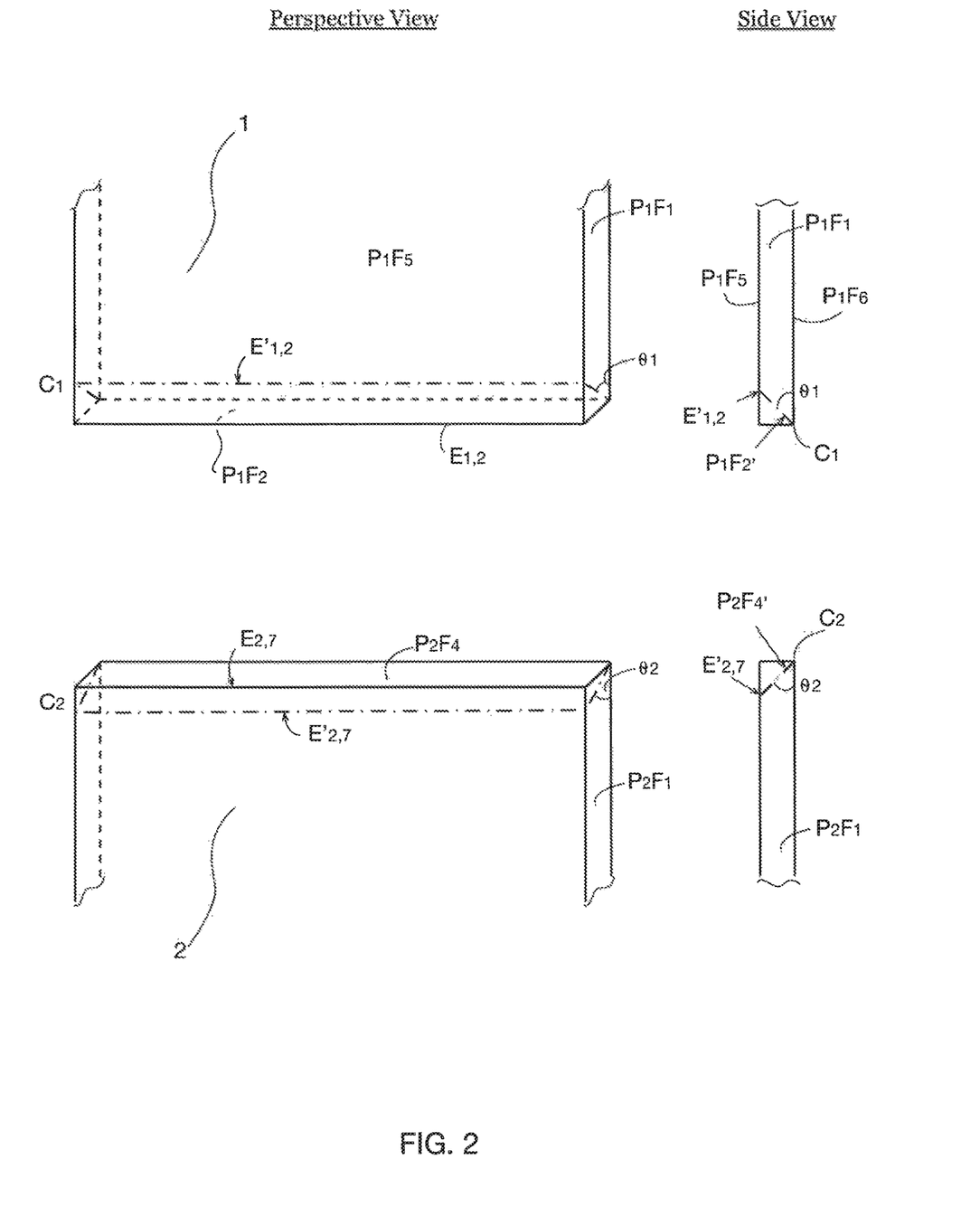
FIG. 2 is a perspective and side view of the edges and faces of the panels to be cut and joined.
Figure 3:
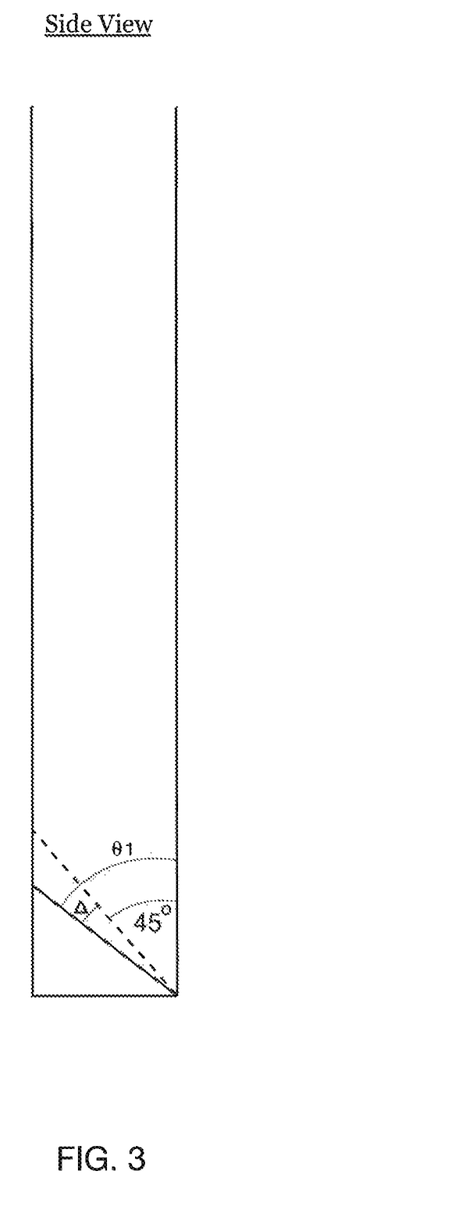
FIG. 3 is a side view of a panel showing the relative angle of miter cut.

Panel 1 may be joined with panel 2 along a line parallel to edges $E_{1,1}$ and $E_{2,8}$, respectively. As shown in FIG. 2, P1F5 of panel 1 is cut (C1) along a line parallel to edge $E_{1,1}$ to form a new edge, $E'_{1,2}$, and a new face, P1F2', that has an angle θ1 with face P1F6. In so doing, a triangular prism of material is removed, including a small portion of face P1F5 and all of face P1F2. Similarly, P2F5 of panel 2 is cut (C2) along a line parallel to edge $E_{2,8}$ to form a new edge, $E'_{2,7}$, and a new face, P2F4', that has an angle θ2 with face P2F6. In making face P2F4', a triangular prism of material is removed, including a small portion of face P2F5 and all of P2F4. In this example, the interior angles θ1 and θ2 are larger than 45 degrees by a small angle Δ as shown in FIG. 3 for θ1, such that θ1≅θ2=(45 deg+Δ). The cutting of the face exposes the core material of the panel, which does not contain anti-reflective, adhesive-resistant coating.

Figure 4:
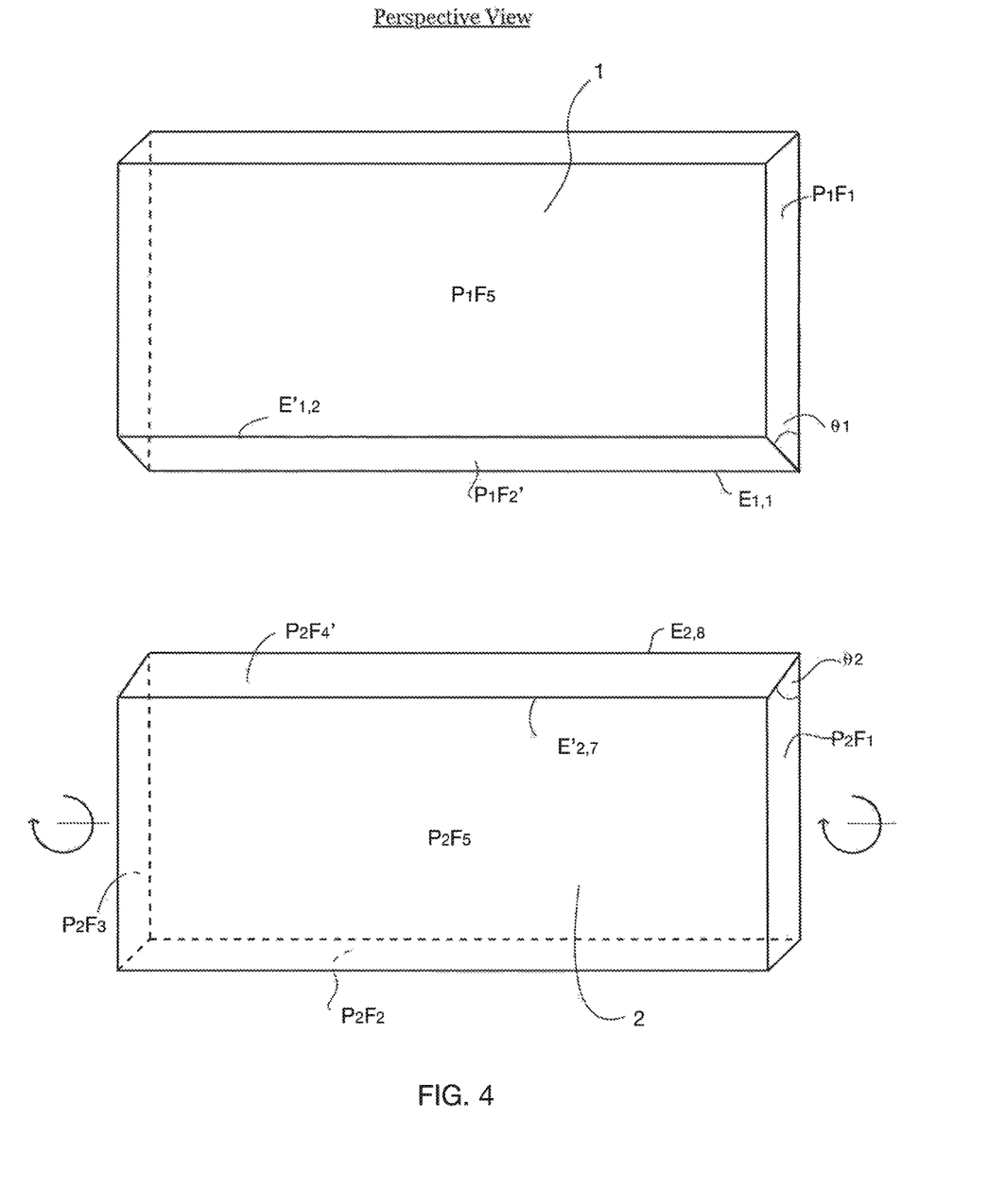
FIG. 4 is a perspective view of the panels showing the cut faces to be joined.
Figure 5:
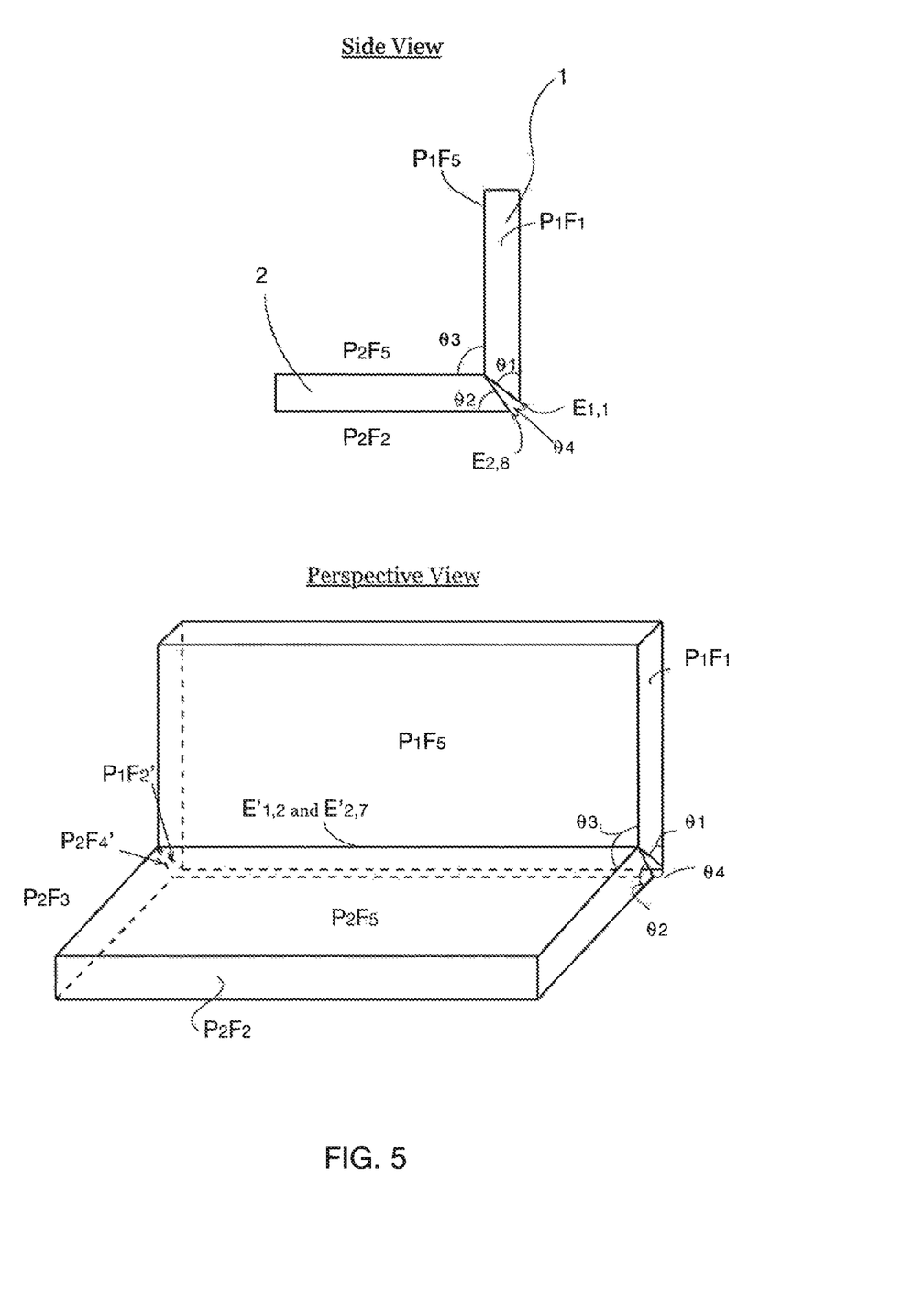
FIG. 5 is a side and perspective view of the panels aligned prior to application of adhesive.

As shown in FIG. 4, panel 2 may then be rotated about an axis passing perpendicular through the faces P2F3 and P2F1, and then aligned with panel 1 as shown in FIG. 5, such that new edge $E'_{1,2}$ is conterminous with new edge $E'_{2,7}$, creating an interior corner along those edges of the panels. New faces P1F2' and P2F4' make contact primarily only along their respective edges $E'_{1,2}$ and $E'_{2,7}$, but the faces P1F2' and P2F4' are otherwise separated from each other by an angle θ4=2Δ. In this example, faces P1F5 and P2F5 are now approximately perpendicular, such that θ3=90 degrees and θ4=(θ1+θ2)−90 deg. As indicated above, θ1≅θ2>45 degrees, so that ½ (θ3)<θ1=θ2.

Figure 6:
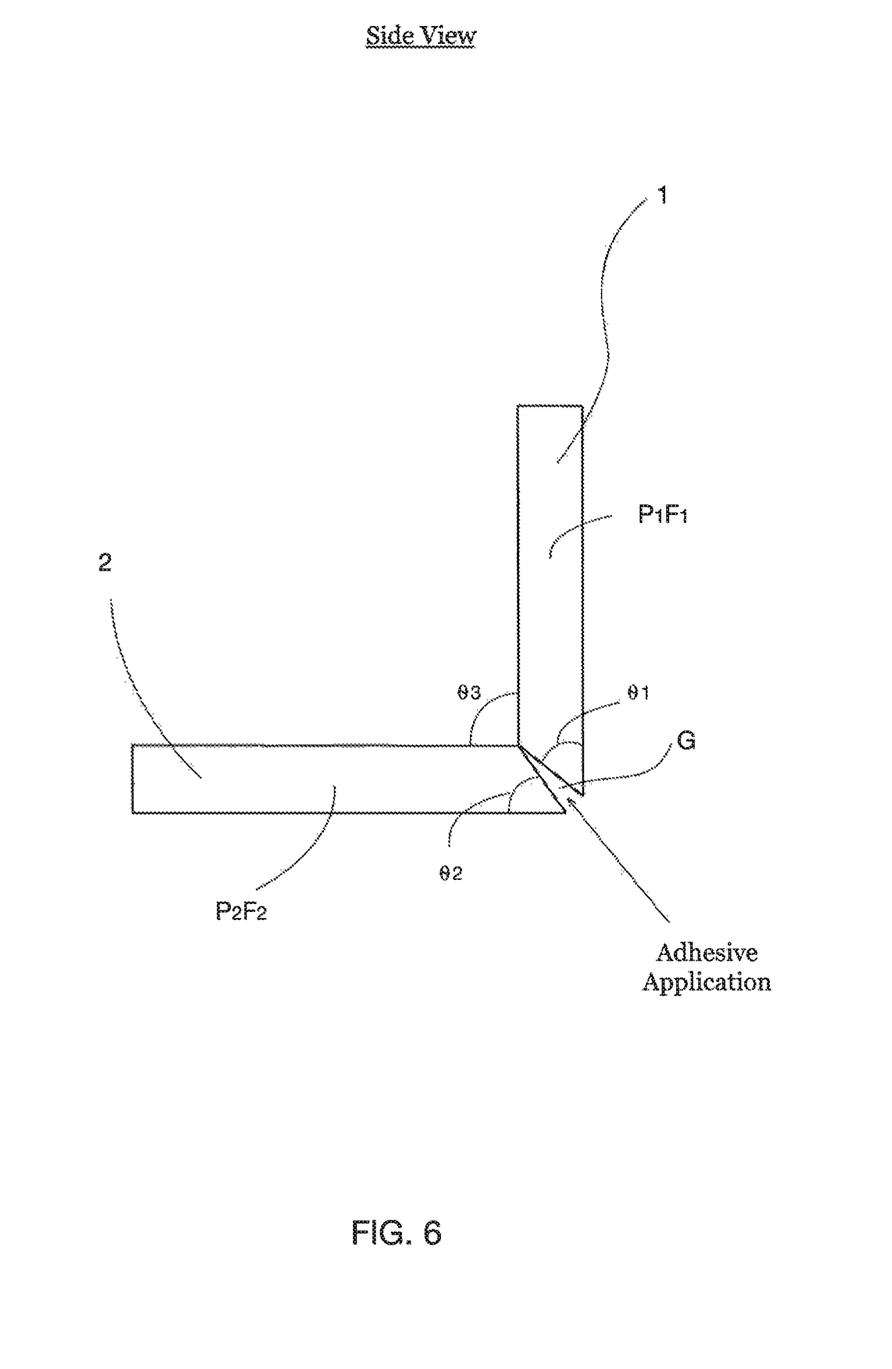
FIG. 6 is a side view of the joined panels showing area of adhesive application.

As indicated above, in this example, the extent by which θ1 and θ2 each exceeds ½(θ3) is Δ (that is, θ1−½(θ3)= θ2−½(θ3)=Δ). Also as indicated above, Δ is small, and should be sufficient only to provide a gap, G, at the external corner of the joint as shown in FIG. 6. The gap has an angular size, which is approximately equal to 2Δ, that will allow an adhesive applied at the gap to be drawn into the joint by capillary action. The desired size of Δ depends primarily upon the thickness of the panel, but is typically 2 to 3 deg. Where the panels are joined at a 45 degree angle, the total angular space at G would be, in this example, 4 to 6 degrees.

While panels 1 and 2 are held in place at the desired angle (in this example, θ3=90 degrees), an appropriate adhesive is applied to the gap (G), which adhesive is drawn by capillary action into the joint to create a wedge of adhesive within the joint. The adhesive then hardens in place, which curing may be aided by catalysis or exposure to light.

The invention claimed is:

1. A method for constructing a display case with exterior and interior sides by joining two or more translucent or transparent panels, each panel with an exterior side and an interior side corresponding to an exterior and an interior side of the display case, along a thin face of each panel, comprising:
   a. shaping at least one thin face of each panel to be joined so that said thin faces are essentially flat and congruent with at least one similar edge along the interior side of each panel;
   b. aligning said thin faces to be joined so that they touch along said similar edge to create an angle between the interior sides of said panels to be joined along said similar edge;
   c. providing a limited space between the thin faces to be joined, except where said thin faces touch at said similar edge, to form an angular gap separating and oriented outward toward the exterior sides of said panels, said angular gap comprising an angle of greater than zero and less than or equal to six degrees sufficient to allow migration of an adhesive across the faces to fill the angular gap by capillary action;
   d. applying said adhesive onto the outer portion of the gap from the exterior side of said panels;
   e. allowing the adhesive to migrate into and fill the gap through capillary action; and
   f. allowing the adhesive to then harden.

2. The method of claim 1, wherein the translucent or transparent panels consist of at least one of the group of acrylic, anti-reflective acrylic, abrasion-resistant acrylic, hard-coated acrylic, and glass.

3. The method of claim 1, wherein the shaping comprises mitering at least one of the panels to be joined.

4. The method of claim 1, wherein the panels are coated with an anti-reflective material.

5. The method of claim 1, wherein a catalyst is added to the adhesive before it is applied onto the gap.

6. The method of claim 1, wherein hardening of the adhesive is aided by the application of ultraviolet light or natural light.

7. A method for constructing a display case with exterior and interior sides by joining two or more translucent or transparent panels, each panel with an exterior side and an interior side corresponding to an exterior and an interior side of the display case, along a thin face of each panel, comprising:
   a. beveling at least one thin face of each panel to be joined, to be essentially flat and congruent, and to create an edge along the interior side of each said panel;
   b. aligning said thin faces of said panels to be joined so that said edges touch along their length to create an angle between said interior sides of said panels to be joined;
   c. providing a limited space between said thin faces to be joined except where said thin faces touch along said edges, which limited space is in the form of an angular gap separating, and oriented toward, the exterior sides of said panels, said angular gap comprising an angle of greater than zero and less than or equal to 6 degrees sufficient to allow migration of an adhesive across the faces by capillary action;
   d. applying an adhesive onto the outer portion of the gap from the exterior side of said panels;
   e. allowing the adhesive to migrate into the gap through capillary action; and
   allowing the adhesive to then harden.

8. The method of claim 7, wherein the translucent or transparent panels consist of at least one of the group of acrylic, anti-reflective acrylic, abrasion-resistant acrylic, hard-coated acrylic, and glass.

9. The method of claim 7, wherein the panels are coated with an anti-reflective material.

10. The method of claim 7, wherein a catalyst is added to the adhesive before it is applied onto the gap.

11. The method of claim 7, wherein hardening of the adhesive is aided by the application of ultraviolet light or natural light.

* * * * *